United States Patent [19]

Harada et al.

[11] 4,060,425
[45] Nov. 29, 1977

[54] SUPER RAPID HARDENING MIXTURE

[75] Inventors: Yutaka Harada; Noriyuki Itai, both of Musashino; Hiroshi Ucikawa, Funabashi; Hajime Kato, Yokohama; Katutoshi Sato, Adachi; Akira Itoh, Adachi, all of Japan

[73] Assignees: Japanese National Railways, Tokyo; Onoda Cement Company Limited, Yamaguchi; Nichireki Chemical Industry Company Limited, Tokyo, all of Japan

[21] Appl. No.: 672,511

[22] Filed: Mar. 31, 1976

[30] Foreign Application Priority Data

Apr. 5, 1975   Japan .................................. 50-40791

[51] Int. Cl.$^2$ .............................................. C04B 7/02
[52] U.S. Cl. .......................................... 106/90; 106/94; 106/96; 106/104; 106/314; 106/315; 260/28.5 AS; 260/28.5 AV; 260/28.5 B; 260/28.5 D; 260/745
[58] Field of Search ............... 106/90, 94, 96, 314, 106/315; 260/28.5 AS, 28.5 B, 28.5 AV, 28.5 D, 745

[56] References Cited

U.S. PATENT DOCUMENTS

| | | | |
|---|---|---|---|
| 2,225,146 | 12/1940 | Bechtold .................. | 106/90 |
| 2,483,806 | 10/1949 | Buckley et al. ........... | 106/96 |
| 2,773,777 | 12/1956 | Alexander ................. | 106/90 |
| 3,030,664 | 4/1962 | Wijard ..................... | 106/90 |
| 3,208,863 | 9/1965 | Eick et al. ................ | 106/96 |
| 3,553,077 | 1/1971 | Quint ....................... | 106/90 |
| 3,650,784 | 3/1972 | Albert et al. ............. | 106/90 |
| 3,663,287 | 5/1972 | Mizunuma et al. ........ | 106/315 |
| 3,864,141 | 2/1975 | Uchikawa et al. ......... | 106/315 |
| 3,867,161 | 2/1975 | Torii et al. ................ | 106/96 |
| 3,869,415 | 3/1975 | Williams ................... | 106/94 |
| 3,954,489 | 5/1976 | Uchikawa et al. ......... | 106/90 |

*Primary Examiner*—Patrick P. Garvin
*Assistant Examiner*—John P. Sheehan
*Attorney, Agent, or Firm*—Oblon, Fisher, Spivak, McClelland & Maier

[57] ABSTRACT

This invention relates to a super rapid hardening mixture comprising a. a super rapid hardening cement in which $11CaO \cdot 7Al_2O_3 \cdot CaZ_2$ (X is a halogen atom), $3CaO \cdot SiO_2$ and $CaSO_4$ are present as indespensable components;

b. at least one short range strength accelerator selected from the group consisting of a calcium aluminate material, a lime material, an amine and an ethylene glycol material and calcium sulfate hemihydrate;

c. at least one emulsion selected from the group consisting of a bituminous emulsion, a rubber latex and a resin emulsion;

d. from 12 to 50 weight percent of water in the total mixture.

15 Claims, 1 Drawing Figure

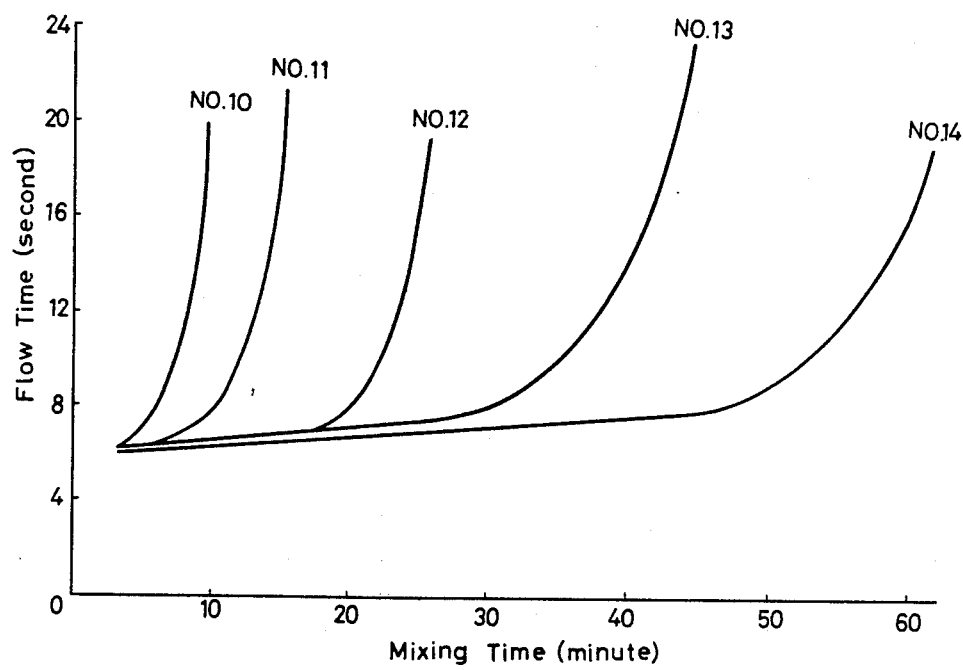

SUPER RAPID HARDENING MIXTURE

This invention relates to a super rapid hardening mixture which comprises a super rapid hardening cement and a bituminous emulsion, a rubber latex and/or a resin emulsion. In the prior art techniques, it is well known that a mixture of Portland cement and an asphalt emulsion can be used as a grout which has the elastic properties for a slab-type track structure.

The use of the mixture of portland cement and an asphalt emulsion is accompanied by the disadvantage that the mixture does not exhibit the desired strength for long period of time and hence the mixture can not be applied for a structure which has a restricted period of time for construction.

To eliminate of this defect, a mixture of a super rapid hardening cement containing calcium haloaluminate and an asphalt emulsion was made. However, this mixture did not provide a hardened mass of the higher strength in a short period of time (in from 1 to 3 hours) though the mixture hardened in a relatively short period of time. It was expected that a mixture could be prepared for which would relieve stress and which shows high strength in a short period of time.

The present study was initiated to attempt to formulate a mixture which would satisfy these demands and it has been found that a mixture of an asphalt emulsion and a super rapid hardening cement which comprises a clinker containing $11CaO.7Al_2O_3.CaX_2$ (X is a halogen atom) mixed with anhydrite; one or more additives of a calcium aluminate material, a lime material, an amine, an ethylene glycol material and calcium sulphate hemihydrate, or a mixture thereof to which is added a set-controlling agent developed early high strength, and that further a mixture of a rubber emulsion and/or a resin emulsion in place of the above asphalt emulsion or two of the three emulsions and the above super rapid hardening cement also developed high early strength.

This invention relates to a super rapid hardening mixture which comprises a mixture of a super rapid hardening cement containing $11CaO.7Al_2O_3.CaX_2$ (X is a halogen atom), $3CaO.SiO_2$ and $CaSO_4$ as indespensable components, with one or more short range strength accelerators such as a calcium aluminate material, a lime material, an amine, an ethylene glycol material or calcium sulphate hemihydrate; a bituminous emulsion; and if necessary water, an aggregate, a filler and a foaming agent and/or a set controlling agent. In place of the bituminous emulsion, one or more mixtures selected from the group of a bituminous emulsion, a rubber latex and a resin emulsion can be mixed to form a super rapid hardening mixture. The super rapid hardening mixture will be stated simply as "the mixture" hereinafter.

In this invention, the super rapid hardening cement is prepared by adding anhydrite ($CaSO_4$) to the clinker powder containing from 1 to 60% by weight of $11CaO.7Al_2O_3.CaX_2$ and more than 5% by weight of $3CaO.SiO_2$, in such amount that the weight ratio of $Al_2O_3/SO_3$ in the cement is from 0.4 to 3.0, or in addition to this cement, a set controlling agent is added. The set controlling agent is at least one member selected from the group consisting of a carboxylic acid such as gluconic acid, tartaric acid, citric acid or the like salts thereof, boric acid, the salts thereof such as borax, calcium borate and the like and a carbonate, sulfate or hydroxide of an alkali metal such as sodium, potassium or lithium.

The set controlling agent is used in a proportion of from about 0.02 to 8% by weight, preferably 0.05 to 5% by weight (inner parts) based on the weight of the super rapid hardening cement. (Unless otherwise indicated, all percentages shown are in weight percents and all parts and ratios and the like are by weight).

If the set controlling agent is added in an amount over or under the above range, the setting properties of the mixture can not be controlled.

Short range strength accelerators include, a calcium aluminate material such as $CaO.Al_2O_3$, $12CaO.7Al_2O_3$, $3CaO.3Al_2O_3.CaF_2$ and $CaO.2Al_2O_3$. The calcium aluminate material is used in an amount of 1 to 50%, preferably 5 to 40% by weight based on the weight of the mixture of the super rapid hardening cement and the calcium aluminate material. If the amount used is less than the lower limit, the effect is negligible. Over the upper limit, the handling time of the mixture of this invention becomes extremely short and difficult.

Suitable examples of a lime material include quick lime and slaked lime. The amount of the lime material used ranges from 0.1 to 25%, preferably from 0.5 to 15%, of the mixture. If the amount used is less than the lower limit, the effect of the addition is negligible. Over and over the upper limit, the setting properties of the mixture are uncontrollable. In case of the quick lime, because of the violent hydration reaction of quick lime, control of the handling time becomes difficult and the effect of the quick lime does not increase proportionally as the addition increase.

A properly calcined lime accelerates the hardening of the mixture by the heat of reaction without disturbing the fluidity of the mixture because it is gently hydrated.

It is desirable to use slaked lime from the viewpoint of the handling characteristics of the mixture. The lime materials can be more effective when they are used together with one of the calcium aluminate series materials described above.

Examples of the amine series materials are, monoethanolamine, diethanolamine, and triethanolamine. The amount of the amine series material employed ranges from 0.002 to 2.5%, preferably from 0.1 to 1%. When they are used together with calcium sulphate hemihydrate, the development of the short range strength of the mixture becomes more rapid. If the amount used is less than 0.002%, the effect of the addition is negligible. Over 2.5% the fluidity of the mixture is relatively low, so the workability of the mixture worsens with the same amount of water added and the strength development of the mixture does not increase proportionally with the amount of the amine.

Examples of the ethylene glycol series materials include monoethylene glycol, diethylene glycol, triethylene glycol and polyethylene glycol. The amount of the added ethylene glycol material used ranges from 0.02 to 1%, preferably from 0.08 to 0.5%. If the amount used is less than 0.02%, the addition is not effective and even over 1%, the effect does not increase with additional amounts thereof. The ethylene glycol series is effective in increasing the strength over both short range and long periods of time without shortening the handling time of the mixture and is effective in removing the thixotropy of the mixture.

The addition of a large amount of the ethylene glycol material does not disturb the workability of the mixture as the amine material does upon mixing with water.

Calcium sulphate hemihydrate is added from 0.2 to 5% in such an amount that the ratio of $Al_2O_3/SO_3$ in the cement mixture is from 0.4 to 3.0. If the amount used is less than 0.2%, the effect of the addition is negligible. Over 5%, the addition is not effective because the strength development is disturbed because with additional amounts of hemihydrate the setting time of the mixture increases.

The bituminous emulsion to be used in this invention is an emulsion formed by emulsifying a bituminous material in water with at least one member selected from the group consisting of a cationic, anionic, nonionic surface active agent and the clay as a main emulsifier. Acids, alkalis, salts, higher fatty acids, protective colloids or the like can also be used to emulsify the bituminous material in water with the main emulsifier. An acid is used primarily with the cationic and/or nonionic surface active agent. An alkali is used mainly with the anionic and/or nonionic surface active agent, and a salt is used with the cationic, anionic and/or nonionic surface active agent. The higher fatty acid also contributes to the emulsification of the bituminous material. These acids, alkalis, salts, protective colloids, clays or the like may be added to the emulsion to adjust the properties thereof, too.

Suitable examples of the bituminous material which are used for the formation of the bituminous emulsion are straight asphalt, blown asphalt, semiblown asphalt, natural asphalt, propane precipitated asphalt, bitumen coal tar, oil tar, pitch, tall oil pitch, fatty acid pitch, heavy oil rubber incorporated bitumen, (rubber dispersed into the above bituminous materials), and resin incorporated bitumen (resin dispersed into the above bituminous materials).

An emulsion formed by adding a rubber latex and/or a resin emulsion to the above-mentioned bituminous emulsion may also be used as the bituminous emulsion in this invention.

All kinds of emulsions can be made which are mixed homogeneously with the hydraulic material, such as cement and cement mixtures containing cement, an aggregate, a filler or a forming agent, in a chemically and mechanically stable state and so as not to disturb the hydration reaction of the hydraulic materials.

The bituminous emulsion contains generally a bituminous material content (evaporated residue) of from 40 to 70% by weight. The penetration at 25° C of the evaporated residue of the bituminous emulsion may be in the range of 10 to 300 generally, too.

The known techniques can be applied to the manufacture of the bituminous emulsion.

Next, a few examples of the desirable bituminous emulsion are explained.

In the cationic emulsion, examples of the cationic emulsifier include mainly higher alkylamines, higher alkyl alkylene polyamines, higher alkyl polyaminoethylene imidazolines, and their polyethoxylated group and a acid salt and quaternary ammonium salt of the above-mentioned amine group, polyaminoimidazoline group.

These emulsifiers can be used with a nonionic emulsifier. Acids such as hydrochloric acid, sulfamic acid, acetic acid and the like, and water-soluble salts such the halides of alkali metal and alkaline earth metals and the like may be used with the emulsifier. The examples of the protective colloid are hydroxyethyl cellulose, methyl cellulose, polyvinyl alcohol, gelatin, a salt of lignin amine, a polyoxyethylene polypropylene glycol ether or the like.

In an anionic emulsion, examples of the anionic emulsifier include mainly salts of Vinsol resin (a product of Herculess powder Co. Ltd). an alkali salt of casein, a fatty acid soap, an alkali salt of a sulphuric acid ester of higher alcohol, sodium alkylbenzene sulphonate, sodium alkylnaphthalene sulphonate, polyoxyethylene sulphonate and the like.

These emulsifiers may be used with the nonionic emulsifier.

Alkalis such as NaOH, KOH, NH$_4$OH and a water-soluble salt of an alkali metal may be used with the emulsifier.

Examples of the protective colloid include carboxymethyl cellulose, mathyl cellulose, hydroxyethyl cellulose, polyvinyl alcohol, lignin sulphonate, polyoxyethylene polypropylene glycohol ether and the like.

In the above-mentioned nonionic emulsion, examples of the nonionic emulsifier include polyoxyethylene higher alcohol ethers, polyoxyethylene alkyl phenyl ethers, polyoxyethylene fatty acid esters, polyoxyethylene alkyl ethers, glycerin fatty acid esters, propylene glycol fatty acid esters, sorbitan fatty acid esters, polyoxyethylene sorbitan fatty esters, polyoxyethylene oxypropylene block polymers and the like. The same acid, alkali, salt or protective colloid as used in the cationic emulsion or anionic emulsion may be used with the nonionic emulsion.

In a clay type emulsion, examples of the emulsifying agent mainly such as bentonite and the like, and also sometimes a mixture of the clay mentioned above and an anionic or nonionic surface active agent. Acids, alkalis, salts and stabilizing agents which are used with the anionic and cationic emulsion are also used in the clay type emulsion.

When the cationic emulsion is used as a bituminous emulsion, the characteristics of the mixture are as follows. For example in a grout type mixture, (1) it is very rare when the mixture of materials is heterogenous in comparison to other mixtures of materials when other types of emulsions are used at the same water cement ratio; (2) the flow time of the mixture at the time just after mixing is short (3) its durability is long (the handling time is long), so the grout type mixture is convenient to pour; (4) the grout type mixture advantageously strengthens the hardened mixture because of the small quantities of water necessary to achieve proper fluidity according to the water-reducing effect of the cationic emulsion; and (5) the long duration of the stress relaxation property is better compared with the other types of emulsions because the tendency of long term strength increases is small.

When a nonionic emulsion is used, the characteristics of the mixture are as follows: (1) The short range strength (about 1 to 2 hours after mixing) development of the mixture at low temperature (below about 10° C) is good. (2) The stability against such mechanical stresses as pumping of the mixture is good. (3) The chemical stability against the modifying agents commonly used such as water-reducing agents for cement, dispersing agents, rubber latexes, resin emulsion and the like is good because the nonionic type emulsion can accept a wide range of modifying agents.

When the anionic emulsion is used, the characteristics are as follows: (1) Air can be easily entrained on mixing. (2) The emulsion has a water-reducing effect. (3) The tendency of long term strength increases is large.

The added amount of the bituminous emulsion is from 0.02 to 3 parts by weight, preferably from 0.15 to 1.5 parts by weight based on the evaporated residue of the emulsion for 1 part by weight of the cement mixture.

Under 0.02 parts by weight, the effect of the stress relaxation for the hardened mixture is negligible, and over 3 parts by weight, the strength development of the hardened mixture is not good.

The rubber latex or the resin emulsion may be added to the mixture together with the bituminous emulsion to modify the properties of the bituminous materials, too.

The examples of the rubber component of the rubber latex to be used in this invention are natural rubber, styrene-butadiene rubber, butyl rubber, styrene-isoprene rubber, acrylonitrilebutadiene rubber, chloroprene rubber and the like.

Examples of the resin component of the resin emulsion to be used in this invention are natural resin, polyvinyl acetate, copolymers of ethylene and vinyl acetate, polyvinylidene chloride, resin of polyacrylic acid esters, alkyd resins and the like. The amount of evaporated residue, other properties, the amount to be added to the mixture, the directions for use and the like are almost the same as that of the bituminous emulsion described above. And the mixture of the bituminous emulsion and the rubber latex and/or resin emulsion can be used in the proper ratio.

Examples of aggregates and fillers include sand, gravel, rubber powders, grains of resin foam, glass beads, micro balloons, pigments, and short fibers.

Examples of the foaming agent are aluminum powder, surface active agents and the like. The surface active agents are used to regulate the density of the mixture by introduction of air foam.

To make the mixture of this invention, the short range strength accelerator is added to the super rapid hardening cement and then a bituminous emulsion, a rubber latex and/or a resin emulsion are added to this mixture. If necessary, an aggregate, a filler and a foaming agent are added and then with or without adjustment of the amount of water in the mixture, a set controlling agent. The mixture is mixed well in a mixer. The mixture can be produced by means of a batch process or a continuous process.

In the instance when adding a small size of aggregate or filler, because the aggregate or the filler is hard to homogeneously mix with the cement mixture, the mixture is prepared by the following steps: (1) First, the set controlling agent is dissolved in a small amount of water for mixing. (2) Next, the super rapid hardening cement and the short range strength accelerator are added to the solution thus obtained and then mixed until a homogeneous paste-like state is achieved. (3) Then, the sand, the filler, the foaming agent, the bituminous emulsion, the rubber latex and/or the resin emulsion are added to the resulting paste and the mixture obtained is mixed well.

When a large size aggregate is used, it is easy to regulate the slump of the mixture by using the bituminous emulsion, the rubber latex and/or the resin emulsion, or by adding the water soluble set controlling agent or the short range strength accelerator previously to these emulsions.

The present mixture contains from 12 to 50 weight percent, preferably from 20 to 40 weight percent of water. In the case that the amount of water of the emulsion in the mixture is less than the minimum limits an amount of water sufficient to exceed the lower limit can be added.

In this invention, it is easy to shorten or lengthen the handling time of the mixture and also to prepare a hardened mixture having a large short range strength by properly adding a set-controlling agent or a short range strength accelerator to the super rapid hardening cement and by adding a bituminous emulsion, a rubber latex and/or a resin emulsion to the mixture thus obtained.

First, a mixture having long handling time characteristics is formed and then just before the placing of the mixture, a short range strength accelerator is added to force the mixture to harden rapidly. It is possible to form a mixture which has excellent stress relaxation, high adhesive and abrasion resistant properties and which exhibits small changes in physical properties with variations in temperature by using a bituminous emulsion modified by mixing a member of the rubber series and/or a member of the resin series or by using a mixture of a bituminous emulsion, a rubber latex and/or a resin emulsion. According to this invention, the rapid hardening properties, the stress relaxation (shock resistance, fatigue resistance), the adhesiveness, the water proofness proof, the sea water resistance, the airtightness, the freezing and thawing resistance, the sound insulating properties, the adiabatic properties, the chemical resistance, the free efflorescence and the like properties of a rapid hardening cement composition are greatly improved.

The mixture of this invention can be effectively used in the construction of pavements, floors and the like, in the preparation of cast material such as pipes, blocks, and the like, in the preparation of filling materials such as grouts for ballast-filled track structures and slab-type track structures, as undersealing materials for concrete pavements, and as grouts for the sealed construction of water supplies and drainages, and the like and as a water-proofing treatment and in cut-off materials such as in the stabilization of slopes, the cut-off walls of dams, reservoirs water-ways, roofs and the like.

The mixture of the invention can also be used effectively in the creation of new structures in mending operations. Having generally described the invention, a more complete understanding can be obtained by reference to certain specific examples, which are provided herein for purposes of illustration only and are not intended to be limiting unless otherwise specified.

The materials used in the examples are as follows:

1. Super rapid hardening cement: Two kinds of cement of which the chemical composition and the specific surface area are shown in Table 1. One is "Jet Cement" (manufactured by Onoda Cement Co. Ltd.) which contains 20.6 percent of $11CaO.7Al_2O_3.CaF_2$ and the other is a cement which contains 31.1 percent of $11CaO.7Al_2O_3.CaF_2$.

2. Tartaric acid, citric acid, gluconic acid, boric acid, sodium carbonate and potassium carbonate are readily available industrial chemicals.

3. Calcium aluminate: Two kinds of calcium aluminate of which the chemical composition, and the specific surface area are shown in Table 1. One aluminate (calcium aluminate I) was manufactured by Asahi Glass Co., Ltd. and the other aluminate (calcium aluminate II) was manufactured by burning a powdered mixture of bauxite having the chemical composition shown in Table I in an electric furnace for 3 hours at a temperature of 1350° C and by pulverising the clinker thus obtained to a specific surface area of 4300 $cm^2/g$. The principal constituent of the calcium aluminate consists of $12CaO.7Al_2O_3$.

4. Calcium hydroxide, triethanolamine, diethylene glycol and calcium sulphate hemihydrate are readily available industrial chemicals.

5. Quick lime: Limestone was burnt at 1400° C for 3 hours and pulverized to a specific surface area of 3200 cm²/g and has the chemical composition shown in Table I.

7. Rubber latex: A chloroprene rubber latex whose solid percentage is 50% is a readily available commodity industrial.

Resin emulsion: An emulsion of a polyacrylic acid ester having a solid percentage of 45% is a readily available industrial commodity.

8. Sand: Sand from the river Fujigawa, Shizuoka

Table I

| Component<br>Material | SiO₂<br>% | Al₂O₃<br>% | Fe₂O₃<br>% | CaO<br>% | MgO<br>% | SO₃<br>% | Ig.loss<br>% | Specific surface<br>m²/g |
| --- | --- | --- | --- | --- | --- | --- | --- | --- |
| Rapid hardening cement I (Jet Cement) | 13.8 | 11.4 | 1.5 | 59.1 | 0.9 | 10.2 | 0.1 | 5,650 |
| Rapid hardening cement II | 8.2 | 16.9 | 1.8 | 53.8 | 0.6 | 17.0 | 0.3 | 4,970 |
| Calcium aluminate I (Aluminous Cement) | 3.0 | 40.0 | 16.9 | 38.7 | 0.4 | — | 1.0 | 3,290 |
| Calcium aluminate II | 2.5 | 43.3 | 1.5 | 51.0 | 0.6 | — | 1.1 | 4,300 |
| Quick lime | 0.5 | 0.1 | 0.6 | 97.7 | 0.8 | — | 0.1 | 3,200 |

6. Bituminous emulsion:
 i. Cationic asphalt emulsion (will be referred to as a C-1, hereinafter: The emulsion was made by emulsifying a straight asphalt (penetration 80 ~ 100) with an emulsifier mainly consists of higher alkyl (hydrogenated tallow) trimethyl ammonium chloride. Its properties are shown in Table II.
 ii. Nonionic asphalt emulsion (will be stated as only N-1, hereafter): The emulsion was made by emulsifying a straight asphalt (penetration at 25° C, 90) with an emulsifier which consists mainly of polyoxyethylene nonylphenol ether (HLB $\approx$ 14). The properties of the emulsion are shown in Table II.
 iii. Anionic asphalt emulsion modified by rubber emulsion (will be referred to hereinafter as LA-1): The emulsion was made by emulsifying the straight asphalt with an emulsifier of which the main emulsifying agent is a sodium salt of Vinsole resin and mixed with a styrene-butadiene rubber latex (45% nonvolatile content) in a ratio of 0.1 as the solid rubber to the evaporated residue of the asphalt emulsion. The properties of the emulsion are shown in Table II.

prefecture, Japan, having particle size under 2.5 mm, a fineness modulus of 1.6, and a density of 2.60 g/cm³ was used.

Gravel: Gravel from the river Fujigawa, having a particle size under 25 mm, and a density of 2.61 g/cm³ was used.

9. Rubber powder: A readily available rubber was used having a particle size under 2.5 mm, and a fineness modulus of 2.2.

10. Water: Normal tap.

11. Aluminum powder: manufactured by Nakashima Metal Foil and Powder Co., Ltd., for cement C-300.

12. High early strength cement: manufactured by Onoda Cement Co., Ltd., and having a chemical composition as follows:

| Ig. loss % | SiO₂ % | Al₂O₃ % | Fe₂O₃ % | CaO % | MgO % | SO₃ % | Specific surface area (g/cm²) |
| --- | --- | --- | --- | --- | --- | --- | --- |
| 0.9 | 20.7 | 5.0 | 2.7 | 65.9 | 1.3 | 2.4 | 4,240 |

The mixing procedure used in the example is as follows: The set controlling agent was dissolved in water, and a super rapid hardening cement and a short range strength accelerator were mixed in the mixer (revolutions 100 r.p.m.) for 1 minute (from this, the time was counted from this point).

An aggregate was added in the mixture with or without a foaming agent which was then an emulsion are added to the resulting mixture and mixed for 2 minutes. Then the mixing was continued in the mixer at the speed of 40 r.p.m..

Table II

| | Properties of Bituminous Emulsion | | | | |
| --- | --- | --- | --- | --- | --- |
| Kinds of emulsion | Charge of particle | Viscosity (degree Engler at 25° C | Mixing property with cement | Evaporated residue (wt.%) | Penetration of evaporated residue at 25° C |
| C - 1 | (+) | 5.8 | pass | 59.6 | 98 |
| N - 1 | | 6.5 | pass | 59.3 | 95 |
| LA - 1 | (−) | 6.2 | pass | 59.1 | 93 |

Table III (Weight Part)

| No. | Temp. of mixing and Curing | Rapid Hardening cement Jet cement | Rapid hardening cement II | Short Range Strength Accelerator Calcium aluminate I | Slaked lime | Calcium Sulfate hemihydrate | Triethanolamine | Diethylen glycol | Set Controlling Agent Citric acid | Boric acid | Sodium carbonate | Bituminous emulsion C-1 | N-1 | LA-1 | Sand | Foaming agent Aluminium powder | Added Amount of Water |
|---|---|---|---|---|---|---|---|---|---|---|---|---|---|---|---|---|---|
| 1 | 5 | 69.7 | | 24 | 6 | | | | 0.12 | | 0.18 | 100 | | | 100 | | 43 |
| 2 | 20 | 69.0 | | 24 | 6 | | | | 0.4 | | 0.6 | 100 | | | 100 | | 40 |
| 3 | 20 | 99.75 | | | | | | 0.1 | 0.15 | | | 100 | | | 100 | 0.01 | 40 |
| 4 | 20 | 98.0 | | | | 1.5 | 0.4 | | 0.1 | | | 100 | | | 100 | 0.01 | 40 |
| 5 | 20 | 98.8 | | | | | 1.0 | | | 0.1 | 0.1 | 100 | | | 100 | 0.01 | 45 |
| 6 | 20 | 98.15 | | | | 1.5 | | 0.2 | 0.15 | | | | 100 | | 100 | 0.01 | 40 |
| 7 | 20 | 98.25 | | | | 1.5 | | | 0.05 | 0.2 | | | 100 | | 100 | 0.01 | 43 |
| 8 | 5 | | 99.0 | | | 0.5 | | | | | 0.5 | 100 | | | 100 | 0.01 | 40 |
| 9 | 20 | 97.8 | | | | 2.0 | 0.1 | | 0.1 | | | 100 | | | 100 | | 40 |
| a | 20 | 100.0 | | | | | | | | | | | | | 100 | 0.01 | 38 |
| b | 20 | 99.85 | | | | | | | 0.15 | | | | 100* | | 100 | 0.01 | 45 |

Note:
1) No. a shows a sample number of a comparative example.
2) No. b shows a sample number of a comparative example.
3) * is a emulsion manufactured by Toa Doro Kogyo Co., Ltd.

EXAMPLE 1

Various mixtures corresponding to sample Nos. 1 to 9 and the comparative examples a and b having the mixing ratios shown in Table III were made.

EXAMPLE 2

Various mixtures corresponding to sample Nos. 10 to 14 having various fluidity values and the mixing ratios shown in Table IV were made.

Table IV (Weight Part)

| No. | Mixing temperature (°C) | Jet cement | Calcium Sulfate hemihydrate | Triethanolamine | C-1 | Sand | Boric acid | Added amount of water |
|---|---|---|---|---|---|---|---|---|
| 10 | 20 | 98.1 | 1.5 | 0.4 | 100 | 100 | 0.05 | 40 |
| 11 | 20 | 98.1 | 1.5 | 0.4 | 100 | 100 | 0.1 | 40 |
| 12 | 20 | 98.1 | 1.5 | 0.4 | 100 | 100 | 0.2 | 40 |
| 13 | 20 | 98.1 | 1.5 | 0.4 | 100 | 100 | 0.4 | 40 |
| 14 | 20 | 98.1 | 1.5 | 0.4 | 100 | 100 | 0.8 | 40 |

The change of the fluidity of the mixture with time is shown in the figure. The figure shows the relation between the flow time of the super rapid hardening mixture made in Example 2 and the mixing time. The fluidity was measured by the J-funnel test according to the specifications for the execution of prepacked concrete proposed by the Japanese Society of Civil Engineers.

EXAMPLE 3

Various mixtures were formulated according to the proportions shown in Table V. After 15 or 60 minutes, 10 parts of quick lime were added to the mixture to formulate mixtures.

Table V (Weight Part)

| No. | Temperature of mixing and curing (°C) | Jet cement | Bituminous emulsion | Sand | Tartaric acid | Added amount of water |
|---|---|---|---|---|---|---|
| 15 | 5 | 89.8 | C-1 100 | 100 | 0.2 | 40 |

Table V-continued (Weight Part)

| No. | Temperature of mixing and curing (°C) | Jet cement | Bituminous emulsion | Sand | Tartaric acid | Added amount of water |
|---|---|---|---|---|---|---|
| 16 | 5 | 89.8 | LA-1 100 | 100 | 0.2 | 40 |
| 17 | 5 | 89.8 | N-1 100 | 100 | 0.2 | 40 |

Test pieces were made from the mixture thus prepared and the strength of the hardened mixtures was measured. The results are shown in Table VI.

EXAMPLE 4

Various mixtures having large stress relaxation were mixed and made according to the proportions of sample Nos. 18 and 19 shown in Table VII.

Table VI

| No. | Mixing time (min.) | Flow time (second) Just after mixed | Flow time (second) After quick lime mixed | Compressive strength (kg/cm$^2$) 1 hr* | Compressive strength (kg/cm$^2$) 28 days | Elastic modulus after 28 days (kg/cm$^2$) |
|---|---|---|---|---|---|---|
| 15 | 15 | 6.2 | 6.7 | 7.5 | 53.2 | 6,700 |
|    | 60 | 6.3 | 7.2 | 7.9 | 55.0 | 6,900 |
| 16 | 15 | 6.7 | 7.4 | 6.3 | 58.0 | 7,600 |
|    | 60 | 6.7 | 7.6 | 6.8 | 58.9 | 7,500 |
| 17 | 15 | 6.8 | 7.4 | 7.6 | 58.0 | 7,800 |
|    | 60 | 6.7 | 7.7 | 8.1 | 59.0 | 8,200 |

Note:
1) The testing method is the same as that in Table XI foot note (1).
2) *shows the time after quick lime was mixed.

Table VII - 1

(Weight Part)

| No. | Temperature of mixing and curing (°C) | Jet cement | Calcium aluminate | Quick lime |
|---|---|---|---|---|
| 18 | 20 | 98.7 | 8 | 2* |
| 19 | 20 | 99.0 | 18 | 2** |

Table VII - 2

| | | | (Weight Part) | | | |
|---|---|---|---|---|---|---|
| No. | Gluconic acid | Potassium carbonate | C-1 | Sand | Rubber powder | Added amount of water |
| 18 | 0.5 | 0.8 | 125 | | 30 | 35 |
| 19 | 0.4 | 0.6 | 150 | 100 | | 45 |

Note:
*shows 2 parts of quick lime.
**shows 2 parts of slaked lime.

EXAMPLE 5

Ten parts of chloroprene rubber latex were added to the mixture which was made by mixing raw materials in the proportions of sample No. 20 shown in Table VIII. A mixture modified by rubber was made.

Table VIII - 1

| | | (Weight Part) | | |
|---|---|---|---|---|
| No. | Temperature of mixing and curing (° C) | Jet cement | Calcium sulfate hemihydrate | Citric acid |
| 20 | 20 | 98.85 | 1.0 | 0.15 |

Table VIII - 2

| | | | (Weight Part) | |
|---|---|---|---|---|
| No. | N-1 | Sand | Aluminum powder | Added amount of water |
| 20 | 90 | 100 | 0.01 | 40 |

EXAMPLE 6

The mixture having large stress relaxation were mixed according to the proportions of sample No. 21 and comparative sample No. c shown in Table IX.

EXAMPLE 7

Mixtures characterized by large stress relaxation were formulated and mixed according to the proportions of sample Nos. 22 and 23 and comparative sample No. d shown in Table X.

Table IX

| | | | (Weight Part) | | | | |
|---|---|---|---|---|---|---|---|
| No. | Temperature of mixing and curing (° C) | Jet cement | Calcium sulfate hemihydrate | Citric acid | Triethanolamine | Sand | C-1 | Added amount of water |
| 21 | 20 | 98.1 | 1.5 | 0.2 | 0.2 | 200 | 150 | 0 |
| c | 20 | 100* | | | | 200 | 150 | 0 |

Note:
1) No. c is a sample of a comparative example.
2) *shows 100 parts of high early strength Portland cement.

Table X - 1

| | | | (Weight Part) | | | | |
|---|---|---|---|---|---|---|---|
| No. | Temperature of mixing and curing (° C) | Jet cement | Calcium aluminate | Calcium sulfate hemihydrate | Diethylene glycol | Citric acid | Potassium carbonate |
| 22 | 20 | 95.9 | | 4 | | 0.1 | |
| 23 | 20 | 79.2 | 19 | 1 | 0.1 | 0.4 | 0.3 |
| d | 20 | 100* | | | | | |

Note:
1) No. d shows a sample number of a comparative example.
2) *shows 100 parts of high early strength Portland cement.

Table X - 2

| | | (Weight Part) | | |
|---|---|---|---|---|
| No. | Bituminous emulsion | Sand | Aggregate | Added amount of water |
| 22 | C-1 50 | 200 | 400 | 35 |
| 23 | N-1 50 | 200 | 400 | 37 |
| d | C-1 50 | 200 | 400 | 32 |

Note:
1) No. d shows a sample number of a comparative example.
2) *shows 100 parts of high early strength Portland cement.

Physical tests of the mixture of the super rapid hardening cement and the bituminous emulsion and of the hardened mixture of examples 1, 4, 5, 6 and 7 were conducted and the results are shown in Table XI. Also, the results of the physical tests of comparative example Nos. a, b, c and d are shown in the same table.

Table XI

| Example | No. | Fluidity (Just after mixing) | | | Handling time (min) | Compressive strength (kg/cm²) | | | | | Elastic modulus (after 28 days) kg/cm² |
|---|---|---|---|---|---|---|---|---|---|---|---|
| | | Flow time (sec) | Flow value (mm) | Slump (cm) | | 1 hr | 1.5 hrs | 3 hrs | 24 hrs | 28 days | |
| 1 | 1 | 6.2 | | | 20 | 4.0 | 6.2 | | 19.8 | 48.2 | 6,300 |
| | 2 | 5.7 | | | 20 | 3.9 | 6.0 | | 28.7 | 65.3 | 8,200 |
| | 3 | 6.0 | | | 22 | 3.6 | 6.2 | | 15.1 | 62.9 | 7,800 |
| | 4 | 6.8 | | | 19 | | 9.1 | | 36.9 | 79.7 | 10,200 |
| | 5 | 6.4 | | | 21 | | 8.5 | | 29.0 | 64.1 | 7,500 |
| | 6 | 6.2 | | | 22 | | 5.3 | | 23.4 | 69.4 | 8,700 |
| | 7 | 6.3 | | | 20 | | 6.9 | | 28.2 | 72.0 | 9,600 |
| | 8 | 7.2 | | | 19 | | 6.4 | | 33.0 | 58.6 | 7,000 |
| | 9 | 4.7 | | | 23 | | 9.7 | | 41.5 | 75.6 | 6,800 |
| | a | 7.0 | | | 210 | | | | 2.0 | 47.5 | 7,100 |
| | b | 7.4 | | | 15 | | 2.7 | 4.8 | 24.6 | 60.4 | 6,200 |
| 4 | 18 | 7.2 | | | 35 | | | 4.4 | 12.4 | 22.7 | 2,800 |
| | 19 | 5.7 | | | 20 | 2.3 | | 6.1 | 11.9 | 32.0 | 4,500 |
| 5 | 20 | 6.8 | | | 32 | | 6.5 | | 30.6 | 52.8 | 5,800 |
| 6 | 21 | | 231 | | 18 | | | 2.8 | 7.7 | 31.1 | |
| | c | | 223 | | 215 | | | | 1.5 | 23.2 | |
| | 22 | | | 21.1 | 57 | | | 44.1 | 157 | 236 | |
| 7 | 23 | | | 21.8 | 64 | | | 40.2 | 155 | 270 | |

Table XI-continued

| Example | No. | Fluidity (Just after mixing) | | | Handling time (min) | Compressive strength (kg/cm²) | | | | | Elastic modulus (after 28 days) kg/cm² |
|---|---|---|---|---|---|---|---|---|---|---|---|
| | | Flow time (sec) | Flow value (mm) | Slump (cm) | | 1 hr | 1.5 hrs | 3 hrs | 24 hrs | 28 days | |
| | d | | | 21.4 | 315 | | | | 59.4 | 147 | |

Note:
1) The tests conducted were in accordance with the procedure established for the execution of prepacked concrete (edited by Japanese Society of Civil Engineers), JIS A-1101; JIS A-1108; JIS A-1132; JIS A-5201. The loading speed of the strength tests and the measurement of the modulus of elasticity was 1 mm/min.
2) The handling time for the examples 1, 4 and 5 is the time which elapses until the flow time reaches 10 seconds. The handling time in examples 6 and 7 is the time which elapses until the setting starts.
3) Modulus of elasticity is the scant modulus of elasticity of the specimen diameter 50× height 100 mm at the stress of 4 kg/cm².

EXAMPLE 8

An anionic asphalt emulsion (evaporated residue, 59.8%, penetration at 25° C, 95) was made by emulsifying straight asphalt (penetration at 25° C, 92) with a polyoxyethylene oleyl ether (HLB $\approx$ 14.5) and sodium dodecylbenzen sulphonate, and was used in the formulation of the following mixture.

The proportions of the mixture are as follows: (part by weight)

| Slaked lime | Citric acid | Sodium carbonate | The above asphalt emulsion | Sand | Added amount of water |
|---|---|---|---|---|---|
| 6 | 0.4 | 0.6 | 280 | 100 | 0 |

It was found from the results of the tests shown in the Figure, Table VII and XI that the mixtures of this invention possess excellent properties. Compressive strength of from 6 to 10 kg/cm², (90 minutes after mixing) were obtained in Example 1, samples Nos. 1 to 9. However, the compressive strength of the hardened mixture of comparative sample No. a was zero (90 minutes after mixing).

The compressive strength of the hardened mixture, (one day after mixing) of Example 1 was from 10 to 20 times higher than that of comparative sample No. a.

The strength development of the hardened mixtures of this invention at low temperature (5° C) was the same as that at ordinary temperatures as shown in samples Nos. 1 and 8 of Example 1.

As shown by samples No. 10 to 14 of Example 2, mixtures were obtained whose handling time is freely controllable. The mixtures have good fluidity and develop substantial strength in a the short range of time. As shown in samples No. 15 to 17 of Example 3, the mixtures having long handling time are obtained. It is therefore possible to transport the mixture by means of a pump and to force it to harden, or the mixture can be forced to harden rapidly by adding one component to the mixture just before pouring.

Mixtures having large stress relaxation and of the small elastic modulus are obtained by using rubber powder as an aggregate as shown in Example 4, sample No. 18. The same effect as that in sample No. 18 was obtained by increasing the amount of the emulsion added in sample No. 19. The same effect as that in sample No. 18 was proved in the sample No. 20 of Example 5, by adding the rubber latex to the mixture.

The results of Example 6 and 7 show that the mixture of this invention gives markedly high strength earlier than the comparative samples.

The mixture obtained in Example 8 gave a compressive strength of 2.1 kg/cm² after 180 minutes of curing just like as in Example 1.

EXAMPLE 9

A mixture was formulated and mixed according to the proportions of sample No. 24 shown in Table XII. The ambient temperature of mixing was 20° C.

Table XII

| | | (Weight Part) | | | | | |
|---|---|---|---|---|---|---|---|
| No. | Jet cement | Calcium sulfate hemihydrate | Citric acid | Rubber latex | Sand | Aluminum powder | Added amount of water |
| 24 | 98.35 | 1.5 | 0.15 | 30 | 100 | 0.01 | 50 |

The flow time of this mixture just after mixing was 6.5 seconds and the strength of the hardened mixture is shown in Table XIII.

Table XIII

| Compressive strength (kg/cm²) | | |
|---|---|---|
| 1 hr | 3 hrs | 28 days |
| 18.7 | 104 | 228 |

EXAMPLE 10

The mixture was formulated mixed according to the proportions of sample No. 25 in Table XIV.
The mixing temperature was 20° C.

Table XIV

| | | (Weight Part) | | | | | |
|---|---|---|---|---|---|---|---|
| No. | Jet cement | Calcium sulfate hemihydrate | Citric acid | Resin emulsion | Sand | Aluminum powder | Added amount of water |
| 25 | 98.35 | 1.5 | 0.15 | 100 | 100 | 0.01 | 40 |

The flow time of this mixture just after mixing was 5.5 seconds and the strength of the hardened mixture is shown in Table XV.

Table XV

| Compressive strength (kg/cm²) | |
|---|---|
| 1 hr | 28 days |
| 6.5 | 75 |

What is claimed is:
1. A super rapid hardening mixture, comprising a. a super rapid hardening cement comprising as essential components 1–60 weight % $11CaO.7Al_2O_3.CaX_2$, wherein X is halogen, more than 5 weight % $3CaO.SiO_2$ and $CaSO_4$ such that the weight ratio of $Al_2O_3/SO_3$ ranges from 0.4–3.0 and such that the upper limit of said $3CaO.SiO_2$ is established by the amounts of said $11CaO.7Al_2O_3.CaX_2$ and $CaSO_4$ present in said cement;

b. at least one short range strength accelerator selected from the group consisting of (b-1) from 1–50 weight % of $CaO.Al_2O_3$, $12CaO.7Al_2O_3$, $3CaO.3Al_2O_3.CaF_2$ or $CaO.2Al_2O_3$, (b-2) from 0.1 – 25 weight % of quick lime or slaked lime, (b-3) from 0.002–2.5 weight % of monoethanolamine, diethanolamine, or triethanolamine, (b-4) from 0.02–1% of monoethyleneglycol, diethyleneglycol, triethyleneglycol or polyethyleneglycol and (b-5) from 0.2–2.5 weight % calcium sulfate hemihydrate with the proviso that $Al_2O_3/SO_3$ ratio of said mixture is maintained within a range of 0.4–3.0;

c. at least one emulsion selected from the group consisting of from 0.02–3.0 parts by weight of a bituminous emulsion based on the nonvolatile content of the emulsion per one part by weight of the said cement mixture, wherein the bituminous material of said emulsion is selected from the group consisting of straight asphalt, blown asphalt, semiblown asphalt, propane precipitated asphalt, natural asphalt, bitumen, coal, tar, oil tar, tar pitch, tall oil pitch, fatty acid pitch, heavy oil, rubber-incorporated bitumen and resin-incorporated bitumen; and d. from 12 to 50% by weight of water in the total mixture.

2. The super rapid hardening mixture of claim 1, wherein said calcium aluminate is present in an amount of 5 to 40 weight % based on said cement.

3. The super rapid hardening mixture of claim 1, wherein said lime is present in an amount of 0.5 to 15 weight percent based on said cement.

4. The super rapid hardening mixture of claim 1, wherein said amine is present in an amount of 0.1 to 1 weight % based on said cement.

5. The super rapid hardening mixture of claim 1, wherein said ethyleneglycol is present in an amount of 0.08 to 0.5 weight % based on said cement.

6. The super rapid hardening mixture as claimed in claim 1, wherein said emulsion is a cationic, anionic, nonionic or claytype emulsion.

7. The super rapid hardening mixture as claimed in claim 1, wherein bituminous emulsion has a non-volatile content from 40 to 70 percent by weight.

8. The super rapid hardening mixture of claim 1, wherein said bituminous emulsion is present in an amount of 0.15 to 1.5 parts by weight based on the nonvolatile content of the emulsion per 1 part by weight of the cement mixture.

9. The super rapid hardening mixture as claimed in claim 1, wherein the rubber component of said rubber incorporated bitumen is at least one member selected from the group consisting of natural rubber latex, styrene-butadiene rubber latex, butyl rubber latex, styrene-isoprene rubber latex, acrylonitrile-butadiene rubber latex and chloroprene rubber latex.

10. The super rapid hardening mixture as claimed in claim 1, wherein the resin component of said resin incorporated bitumen is at least one member selected from the group consisting of natural resin, polyvinyl acetate, copolymer of ethylene and vinyl acetate, polyvinyliden chloride, polyacrylic acid ester and alkyd resin.

11. The super rapid hardening mixture as claimed in claim 1, wherein at least one aggregate or one filler selected from the group consisting of sand, gravel, rubber powder, grain of resin foam, glass bead, microballoon, pigment and short fiber is added to the mixture.

12. The super rapid hardening mixture as claimed in claim 1, wherein at least one set controlling agent selected from the group consisting of an carboxylic acid which is gluconic acid, tartaric acid or citric acid; the salt thereof; boric acid, the salt thereof; which is borax or calcium borate; and carbonate, sulfate and hydroxide of alkali metal is added to the mixture.

13. The super rapid hardening mixture of claim 12, wherein said set controlling agent is present in said mixture in an amount of 0.02 to 8% by weight based on the weight of said mixture.

14. The super rapid hardening mixture of claim 13, wherein said set controlling agent is present in an amount of from 0.05 to 5 weight percent.

15. The super rapid hardening mixture as claimed in claim 1, wherein aluminum powders or a surface active agent is added to the mixture as a foaming agent.

* * * * *